(12) United States Patent
Nishimura (10) Patent No.: US 9,811,073 B2
(45) Date of Patent: Nov. 7, 2017

(54) MACHINE TOOL WITH THERMAL DISPLACEMENT CORRECTION

(71) Applicant: FANUC Corporation, Yamanashi (JP)

(72) Inventor: Takuma Nishimura, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 363 days.

(21) Appl. No.: 14/312,101

(22) Filed: Jun. 23, 2014

(65) Prior Publication Data

US 2014/0379117 A1    Dec. 25, 2014

(30) Foreign Application Priority Data

Jun. 24, 2013 (JP) ................................. 2013-131684

(51) Int. Cl.
*G05B 19/40* (2006.01)
*G05B 19/404* (2006.01)

(52) U.S. Cl.
CPC .. *G05B 19/404* (2013.01); *G05B 2219/37405* (2013.01); *G05B 2219/49219* (2013.01)

(58) Field of Classification Search
None
See application file for complete search history.

(56) References Cited

U.S. PATENT DOCUMENTS

| | | | |
|---|---|---|---|
| 4,471,443 A * | 9/1984 | Kinoshita | G05B 19/232 318/572 |
| 4,928,019 A * | 5/1990 | Tomikawa | B23Q 15/18 250/559.3 |
| 5,581,467 A * | 12/1996 | Yasuda | G05B 19/404 700/193 |
| 5,619,414 A * | 4/1997 | Ishii | G05B 19/404 318/565 |
| 5,795,112 A * | 8/1998 | Senda | G05B 19/404 408/13 |
| 5,833,407 A * | 11/1998 | Senda | G05B 19/404 318/634 |
| 6,234,730 B1 * | 5/2001 | Shimizu | B23Q 11/0003 374/E3.004 |

(Continued)

FOREIGN PATENT DOCUMENTS

CN    102554711 A    7/2012
JP    6-55410 A    3/1994

(Continued)

OTHER PUBLICATIONS

Ramesh, R.; Mannan, M.A. and Poo, A.N., "Error Compensation in Machine Tools—A Review Part I: Geometric, Cutting-Force Induced and Fixture-Dependent Errors", 2000, Intl. Journal of Machine Tools and Manufacture, vol. 40, pp. 1235-1256.*

(Continued)

*Primary Examiner* — Mohammad Ali
*Assistant Examiner* — Kelvin Booker
(74) *Attorney, Agent, or Firm* — HAUPTMAN HAM, LLP (57) ABSTRACT

A machine tool includes a shaft load measuring unit measures a load of the main shaft motor. When a measured load of the main shaft motor exceeds a predetermined value, it is determined that a tool is brought into contact with a work. Detection and correction of thermal displacement of the main shaft are performed by comparing a reference time and a measured time for the tool to reach the work.

6 Claims, 7 Drawing Sheets

(56) References Cited

U.S. PATENT DOCUMENTS

| | | | | |
|---|---|---|---|---|
| 6,316,903 | B1* | 11/2001 | Shamoto | G05B 19/416 318/625 |
| 6,341,245 | B1* | 1/2002 | Ueta | G05B 19/404 318/564 |
| 6,456,896 | B1* | 9/2002 | Ito | G05B 19/404 700/174 |
| 6,508,614 | B1* | 1/2003 | Ozaki | B23Q 1/38 310/90.5 |
| 6,566,835 | B1* | 5/2003 | Teraoka | G05B 19/404 318/569 |
| 7,112,762 | B2* | 9/2006 | Finley | H02K 15/165 219/201 |
| 7,635,828 | B2* | 12/2009 | Finley | H02K 15/165 219/494 |
| 8,131,385 | B2* | 3/2012 | Yuzawa | G05B 19/27 318/561 |
| 9,266,209 | B2* | 2/2016 | Murahashi | B23Q 11/0007 |
| 2002/0004688 | A1* | 1/2002 | Kojima | G05B 19/404 700/193 |
| 2002/0038189 | A1 | 3/2002 | Mizuguchi et al. | |
| 2003/0121574 | A1* | 7/2003 | Brenner | B23K 10/027 148/565 |
| 2003/0205984 | A1* | 11/2003 | Yoshida | G05B 19/404 318/801 |
| 2006/0089745 | A1 | 4/2006 | Suzuki et al. | |
| 2006/0218811 | A1 | 10/2006 | Sato | |
| 2006/0288787 | A1* | 12/2006 | Mistry | G01B 7/282 73/660 |
| 2009/0204272 | A1* | 8/2009 | Yuzawa | G05B 19/27 700/302 |
| 2011/0004343 | A1* | 1/2011 | Iida | B25J 9/1638 700/253 |
| 2012/0123586 | A1* | 5/2012 | Maekawa | G05B 19/404 700/173 |
| 2012/0143369 | A1 | 6/2012 | Prust | |
| 2013/0104707 | A1* | 5/2013 | Nakagawa | B23Q 11/0007 82/118 |
| 2013/0166044 | A1* | 6/2013 | Hon | B23Q 17/20 700/61 |
| 2013/0190921 | A1* | 7/2013 | Maekawa | B23Q 11/0007 700/177 |
| 2013/0211598 | A1* | 8/2013 | Fujii | G05B 19/404 700/275 |
| 2013/0236262 | A1* | 9/2013 | Hon | B23Q 15/225 409/132 |
| 2013/0327167 | A1* | 12/2013 | Sasaki | G05B 19/404 74/89.32 |
| 2014/0102268 | A1* | 4/2014 | Hariki | B23B 29/125 82/118 |
| 2015/0276633 | A1* | 10/2015 | Koyama | G01M 99/002 702/94 |
| 2016/0008940 | A1* | 1/2016 | Yoshimura | B23G 1/02 82/1.11 |

FOREIGN PATENT DOCUMENTS

| | | |
|---|---|---|
| JP | 2002-86329 A | 3/2002 |
| JP | 2006-116663 A | 5/2006 |
| JP | 2006-281335 A | 10/2006 |
| JP | 4299761 B2 | 7/2009 |
| JP | 4359573 B2 | 11/2009 |
| JP | 4803491 B2 | 10/2011 |
| JP | 2012-187683 A | 10/2012 |
| JP | 2013-082022 A | 5/2013 |

OTHER PUBLICATIONS

Ramesh, R.; Mannan, M.A. and Poo, A.N., "Error Compensation in Machine Tools—A Review Part II: Thermal Errors", 2000, Intl. Journal of Machine Tools and Manufacture, vol. 40, pp. 1256-1284.*

Starodubov, V.S., "Reducing and Correcting the Temperature Deformation of Numerically Controlled Machine Tools", 2008, Russian Engineering Research, vol. 28, No. 2, pp. 135-143.*

Tseng, P.-C. and Ho, J.-L., "A Study of High-Precision CNC Lathe Thermal Errors and Compensation", 2002, Intl. Journal of Advance manufacturing Technology, vol. 19, pp. 850-858.*

Xu, Z.Z.; Liu, X.J.; Kim, H.K.; Shin, J.H. and Lyu, S.K., "Thermal Error Forecast and Performance Evaluation for an Air-Cooling Ball Screw System", 2011, Intl. Journal of Machine Tools and Manufacture, vol. 51, pp. 605-611.*

Yuan, J. and Ni, J., "The Real-time Error Compensation Technique for CNC Machining Systems", 1998, Mechatronics, vol. 8, pp. 359-380.*

King, H. and Heeley, K., "A Viscous Drive Device for Use in Instrument Displacement Controls", Nov. 6, 1972, CSIRO Division of Applied Physics, National Standards Laboratory.*

Yang, J.; Mei, X.; Zhao, L.; Ma, C.; Shi, H. and Feng, B., "Thermal Error Compensation on a Computer Numerical Control Machine Tool Considering Thermal Tilt Angles and Cutting Tool Length", Sep. 25, 2014, Journal of Engineering Manufacture, 1-20.*

Decision to Grant a Patent mailed Jan. 20, 2015, corresponding to Japanese patent application No. 2013-131684.

* cited by examiner

MACHINE TOOL WITH THERMAL DISPLACEMENT CORRECTION

RELATED APPLICATIONS

The present application claims priority to Japanese Application Number 2013-131684, filed Jun. 24, 2013, the disclosure of which is hereby incorporated by reference herein in its entirety.

BACKGROUND OF THE INVENTION

Field of the Invention

The present invention relates to a machine tool, and more particularly, to a machine tool with a thermal displacement correction function.

Description of the Related Art

Previously, there have been used numerical control machine tools each of which includes: a main shaft fixed to a straight line movement shaft; a table having two or more straight line movement shafts; a rotating table with a rotating shaft, which is provided on the table and fixes a machining work; and a numeric value control device for controlling the main shaft and the tables. In the numerical control machine tools above, machining accuracy is guaranteed at the time of shipment, however, subsequent usage causes thermal displacement of the main shaft due to heat generated by a heat source such as a motor and a bearing. Thus, it is very important to correct the thermal displacement above in order to maintain machining accuracy.

With regard to the thermal displacement, especially a main shaft is sometimes largely displaced in a fore-and-aft direction thereof due to heat generated by a motor and a bearing. In that case, machining accuracy may decrease because errors occur in a machining amount in the fore-and-aft direction of the main shaft.

Japanese Patent Laid-Open JP2006-281335A discloses a technique as means for solving the problem above, in which temperature of respective components of a machine tool is measured, and thermal displacement is estimated on the basis of the measured temperature and a coordinate of a blade edge position.

Japanese Patent Laid-Open JP2006-116663A discloses a technique of calculating thermal displacement on the basis of a load and a rotation speed of a main shaft, and an amount of last thermal displacement.

Japanese Patent Laid-Open JP2013-82022A discloses a technique of determining a correction amount from a difference between a coordinate at the time of first contact detection and a coordinate at the time of second contact detection on the basis of detection of a detector in order to eliminate or reduce duration of a warm-up operation.

In the technique disclosed in Japanese Patent Laid-Open JP2006-281335A, since it is required to attach a sensor for temperature measurement to each of portions inside a machine tool to measure temperature of respective components of the machine tool, it is thought that possibility of failure in attached sensors may increase to cause a cost increase.

In the technique disclosed in Japanese Patent Laid-Open JP2006-116663A, since calculation is performed on the basis of a load and a rotation speed of the main shaft, it may be difficult to estimate the displacement in consideration of factors other than an operation of the machine, such as circumstances where the machine is installed.

In the technique disclosed in Japanese Patent Laid-Open JP2013-82022A, since a contact sensor is used for performing detection at the time of the contact detection, there is a possibility that appropriate detection cannot be achieved, or effort of maintenance of the sensor is required depending on the reliability of the sensor.

SUMMARY OF THE INVENTION

An object of the present invention is to provide a machine tool capable of simply detecting and correcting displacement in the machine tool caused by a location error and deformation of a main shaft.

A machine tool with a thermal displacement correction in accordance with the present invention includes: a main shaft straight line movement shaft for moving a main shaft provided with a tool; two or more table straight line movement shafts for moving a table; and a numeric value control device for controlling the main shaft straight line movement shaft and the table straight line movement shafts. The numerical control machine tool includes: a shaft load measuring unit configured to measure a load of a main shaft motor driving the main shaft straight line movement shaft; a reference contact time storage unit configured to a time from when the main shaft starts to move and time measurement begins at a predetermined position where the tool is not in contact with a work arranged on the table to when the load of the main shaft motor measured by the shaft load measuring unit exceeds a predetermined value to be determined that the tool contacts with the work, as a reference contact time; an actual contact time storage unit configured to store a time from when the main shaft starts to move and time measurement begins at the predetermined position where the tool is not in contact with the work arranged on the table to when the load of the main shaft motor measured by the shaft load measuring unit exceeds a predetermined value to be determined that the tool contacts the work in machining after the reference contact time, as an actual contact time; a thermal displacement calculation unit configured to calculate thermal displacement from a feed speed of the main shaft and a time difference between the reference contact time and the actual contact time when the time difference exceeds a predetermined time; and a thermal displacement correction unit configured to correct a movement amount of the main shaft straight line movement shaft, based on the thermal displacement calculated by the thermal displacement calculation unit.

The machine tool above detects and corrects thermal displacement of a main shaft by detecting whether a measurement load exceeds a predetermined value to be determined whether a tool is brought into contact with a work and by comparing a reference time and an actual measured time, by when the tool is brought into contact with the work. Accordingly, no sensor is required to detect the thermal displacement, so that reliability and maintainability of the machine tool are improved. In addition, since feedback from a load of the main shaft allows a machining operation data with favorable machining accuracy to be stored, it is possible to respond to a change in circumstances where the machine is installed.

A machine tool with a thermal displacement correction in accordance with the present invention includes: a main shaft straight line movement shaft for moving a main shaft provided with a tool; two or more table straight line movement shafts for moving a table; and a numeric value control device for controlling the main shaft straight line movement shaft and the table straight line movement shafts. The numerical control machine tool includes: a shaft load measuring unit configured to measure a load of a main shaft motor driving the main shaft straight line movement shaft; a reference contact coordinate storage unit configured to store a coordinate where the load of the main shaft motor measured by the shaft load measuring unit exceeds a predetermined value to be determined that the tool contacts with the work, as a reference contact coordinate; an actual contact coordinate storage unit configured to store a coordinate where the tool contacts the work with the load of the main shaft motor measured by the shaft load measuring unit exceeds the predetermined value in machining after the reference contact coordinate is stored; a thermal displacement calculation unit configured to calculate a value of a difference between the reference contact coordinate and the actual contact coordinate as a thermal displacement when the difference exceeds a predetermined value; and a thermal displacement correction unit configured to correct a movement amount of the main shaft straight line movement shaft, based on the thermal displacement calculated by the thermal displacement calculation unit.

The machine tool above detects and corrects thermal displacement of a main shaft by detecting whether a measurement load exceeds a predetermined value to be determined whether a tool is brought into contact with a work and by comparing a reference coordinate and an actual measured coordinate, at which the tool is brought into contact with the work. Accordingly, no sensor is required to detect the thermal displacement, so that reliability and maintainability of the machine tool are improved. In addition, since feedback from a load of the main shaft allows a machining operation data with favorable machining accuracy to be stored, it is possible to respond to a change in circumstances where the machine is installed.

The present invention including the configuration described above enables a machine tool capable of simply detecting and correcting displacement in the machine tool caused by an error and deformation of a main shaft to be provided.

BRIEF DESCRIPTION OF THE DRAWINGS

The object of the present invention described above, and other objects and features of the present invention, will be apparent by descriptions on embodiments below with reference to accompanying drawings. The drawings are as follows.

DETAILED DESCRIPTION OF THE PREFERRED EMBODIMENTS

Figure 1:
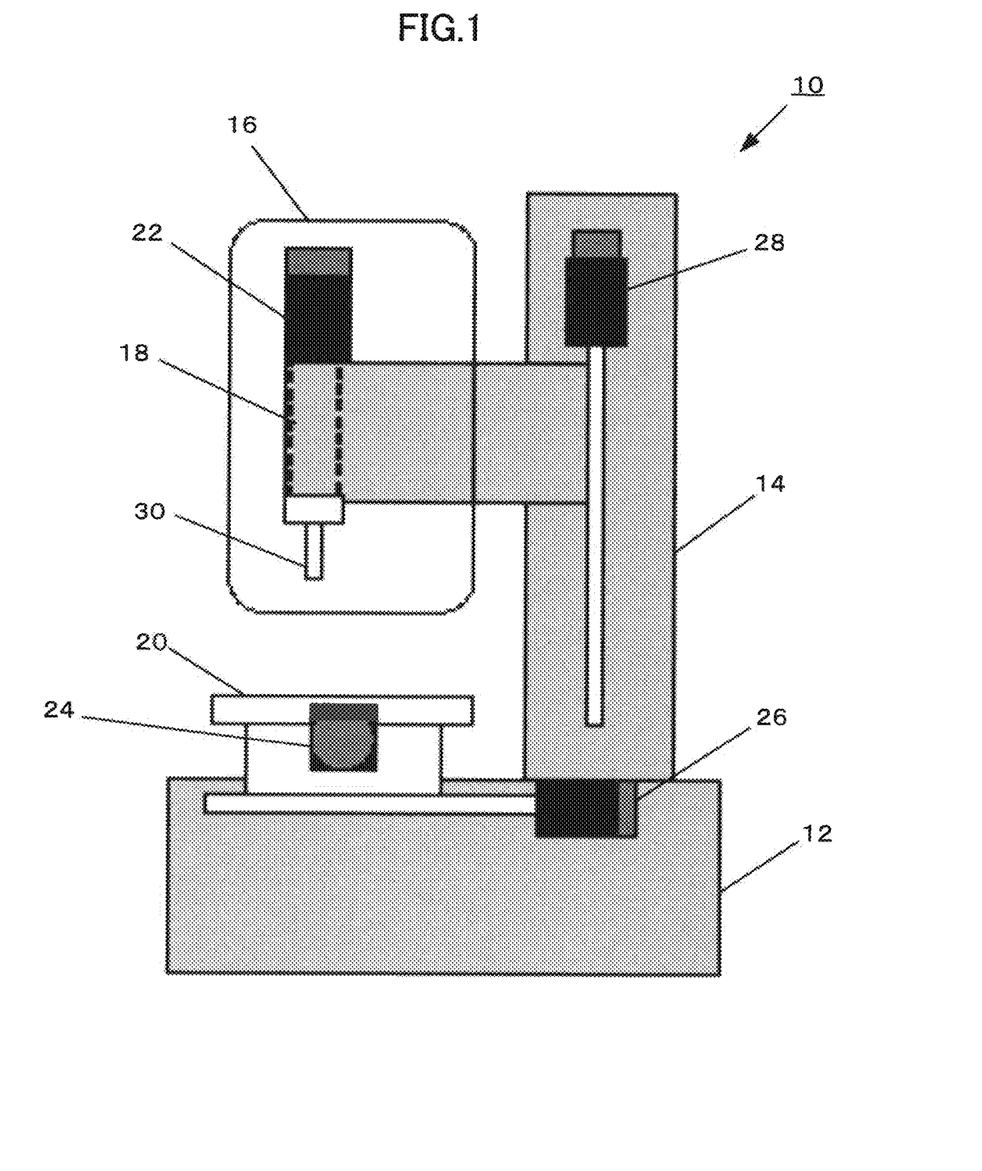
FIG. 1 is a schematic diagram of a numerical control machine tool.

FIG. 1 shows an outline of a numerical control machine tool. A numerical control machine tool 10 is composed of a bed 12, a column 14, a main shaft 16, a main shaft head 18, a table 20, and the like. The bed 12 is provided at a bottom of the machine tool, and the column 14 and the table 20 are provided on the bed 12. An X-axis motor 24 and a Y-axis motor 26 are provided in a lower part of the table 20, and it is possible to drive the table 20 in a plane by driving the X-axis motor 24 and the Y-axis motor 26. In addition, the column 14 is provided with the main shaft head 18 as well as a Z-axis motor 28 that enables the main shaft head 18 to be driven in a vertical direction or the Z-axis direction. Each of the X-axis motor 24, the Y-axis motor 26, and the Z-axis motor 28, is composed of a servo motor.

The main shaft head 18 is provided in its end opposite to the column 14 with the main shaft 16, and a main shaft motor 22 for driving the main shaft 16 is attached on the main shaft head 18.

In addition, a tool 30 is attached to a lower part of the main shaft 16.

While the table 20 is moved along an XY plane by the X-axis motor 24 and the Y-axis motor 26, the main shaft 16 is moved forward and backward in the Z-axis direction by the Z-axis motor 28 so that machining of a work (not shown) provided on the table 20 is performed with the tool 30 attached to the main shaft 16.

Figure 2:
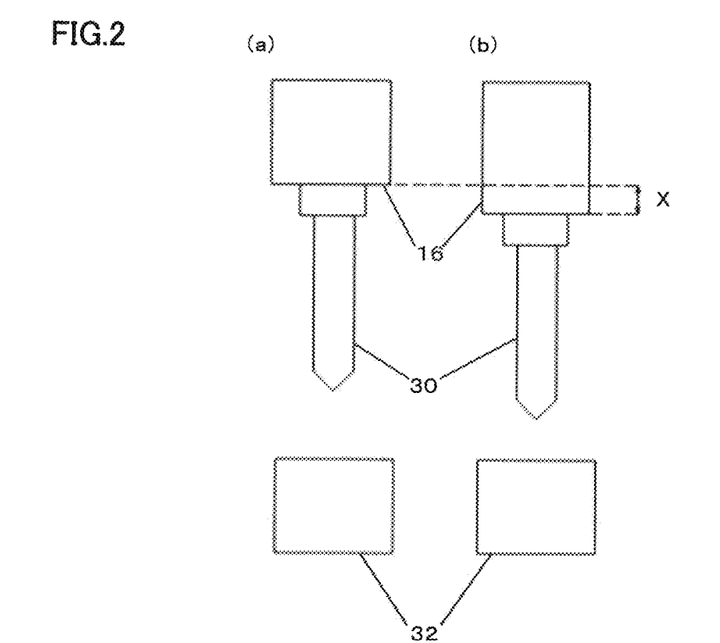
FIG. 2 is an exemplary diagram showing a relation among a main shaft, a tool, and a work.
Figure 3:
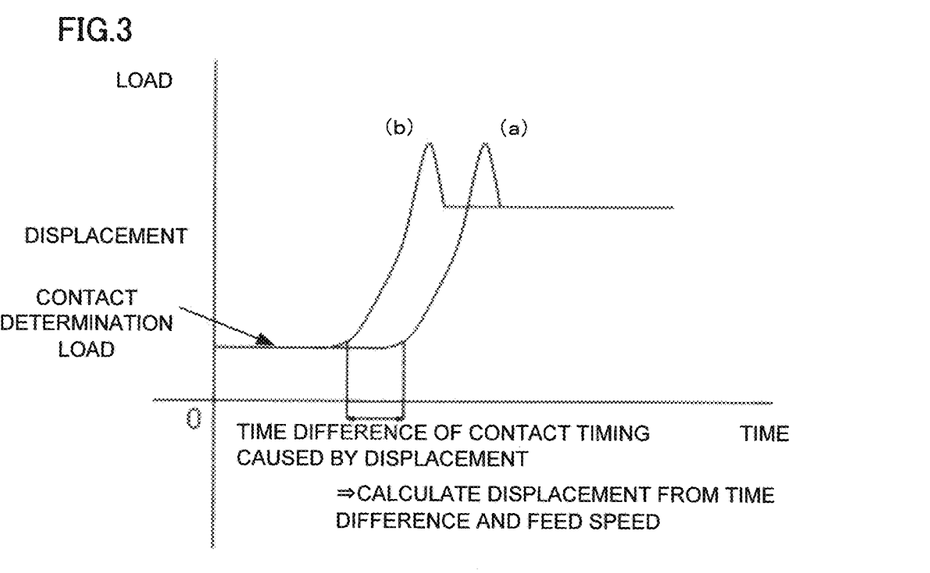
FIG. 3 shows a difference between contact times of the tool with the work before displacement and after displacement.

FIGS. 2 and 3 show a basic principle. FIG. 2 shows a relation among the main shaft 16, the tool 30, and a work 32, and (a) portion of FIG. 2 shows an ideal state before displacement as well as (b) portion of FIG. 2 shows a state after displacement. As compared with the ideal state before displacement in the (a) portion of FIG. 2, in the state in the (b) portion of FIG. 2, the main shaft 16 and the tool 30 are displaced so as to extend downward due to heat generated by a motor and the like. When the state of the main shaft 16 becomes a displaced state due to heat generated by a motor and the like from the ideal state before displacement, the displacement is detected on the basis of a time from a start of movement of the tool 30 to contact of the tool 30 with the work 32, or a movement distance of the tool 30 until the tool 30 contacts the work 32. In addition, detection of contact of the tool 30 with the work 32 is performed by monitoring a load applied to the main shaft motor 22 without separately providing a sensor for the detection.

FIG. 3 shows that a difference of a time until the tool 30 contacts the work 32 occurs between an ideal state before displacement and a state after displacement. As shown in FIG. 2, the tool in the (b) portion of FIG. 2 becomes a state so as to extend downward as compared with the (a) portion of FIG. 2. Accordingly, as shown in FIG. 3, a time until contact of the tool is determined in the state after displacement is shorter than that in the state before the displacement. The displacement is calculated from the time difference above and a feed speed of the tool 30 to perform correction thereof.

Figure 4A:
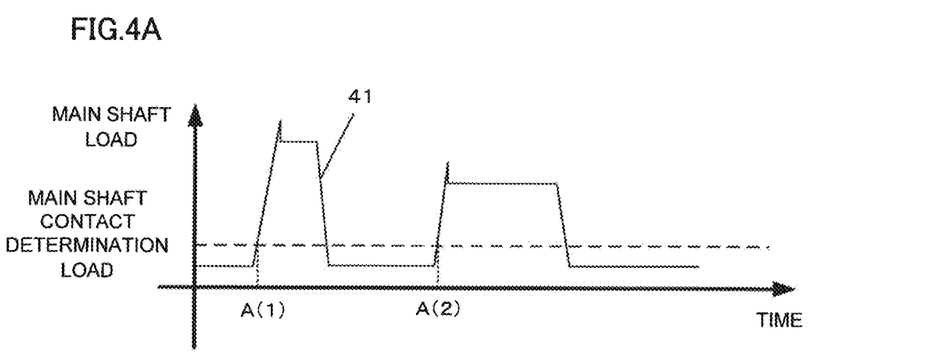
FIGS. 4A and 4B are schematic diagrams showing correction of thermal displacement.

In one embodiment, as shown in FIG. 4A, a first series of machining programs is operated at a temperature of a machine in an ideal state as a first step. In the first series of machining programs, timing is started at the same time when operation of the machining programs is started, and then every time when the tool 30 is brought into contact with a machining work or the work 32 is recorded as A(1), A(2) . . . in order. With regard to contact determination of the tool, main shaft contact determination is conducted by monitoring a main shaft load, and the tool is determined to be brought in contact with the work by detecting main shaft load with equal to or more than a predetermined value at the moment when the rotating tool 30 is brought into contact with the work 32 without a command of changing a rotation speed of the main shaft motor 22 just before the determination. The main shaft load in the first step is shown as 41 in FIG. 4A.

Figure 4B:
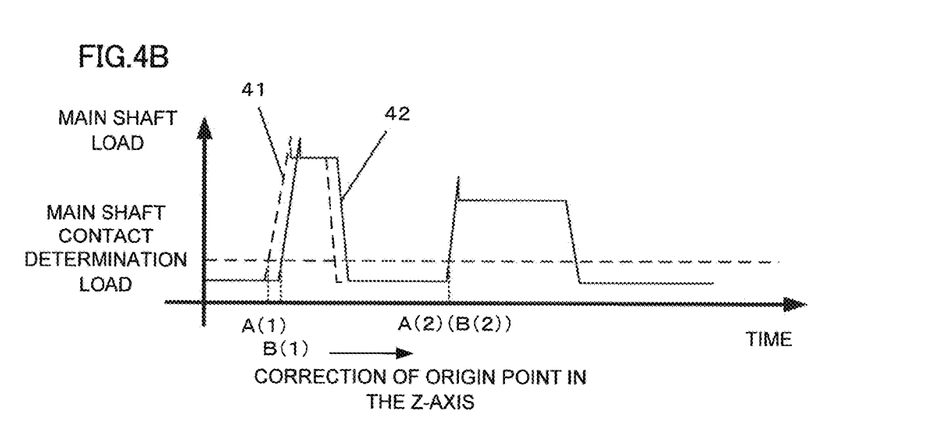

Next, as shown in FIG. 4B, the machining programs exactly the same as those in the first step are operated as a second step. Like the first step, timing is started by monitoring a main shaft load at the same time when operation of the machining programs is started, and every time until the tool contacts the work is measured to compare a time when main shaft contact is determined and the time recorded in the first step. In a case where there is a time difference equal to or more than a threshold value as shown at A(1) and B(1) in FIG. 4B when the two times are compared, the next and succeeding origin in the Z-axis is corrected so that machining proceeds to subsequent machining operation. By the correction of the origin, it can be expected that the time difference between the first and second steps is reduced to a value within the threshold value as shown at A(2) and B(2) in FIG. 4B. Repeating the series of the flow enables machining accuracy in an ideal state to be maintained even if ideal circumstances of machining cannot be maintained. The main shaft load in the second step is shown as 42 in FIG. 4B.

Figure 5:
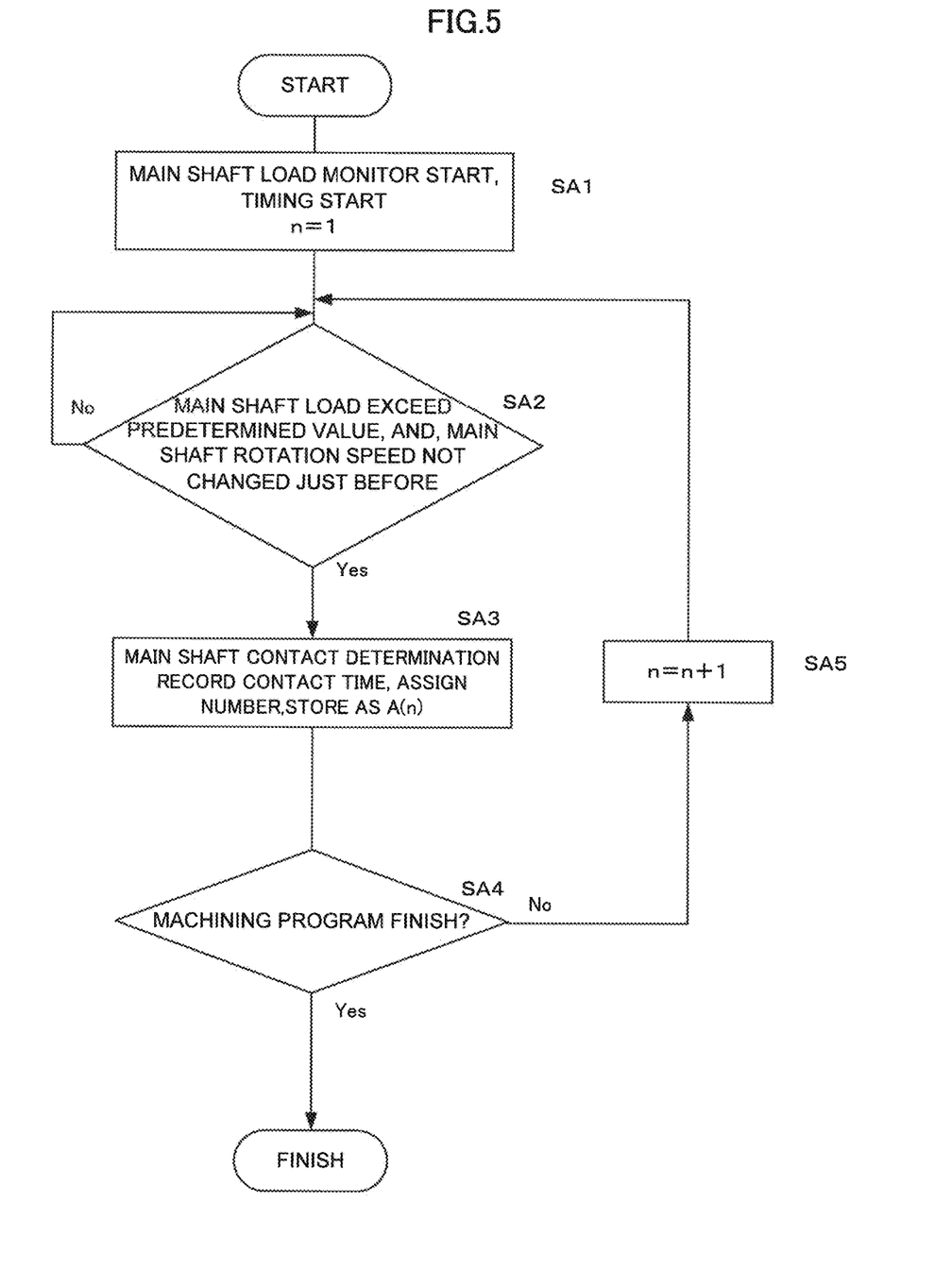
FIG. 5 is a flow chart showing a flow of setting a reference time.
Figure 6:
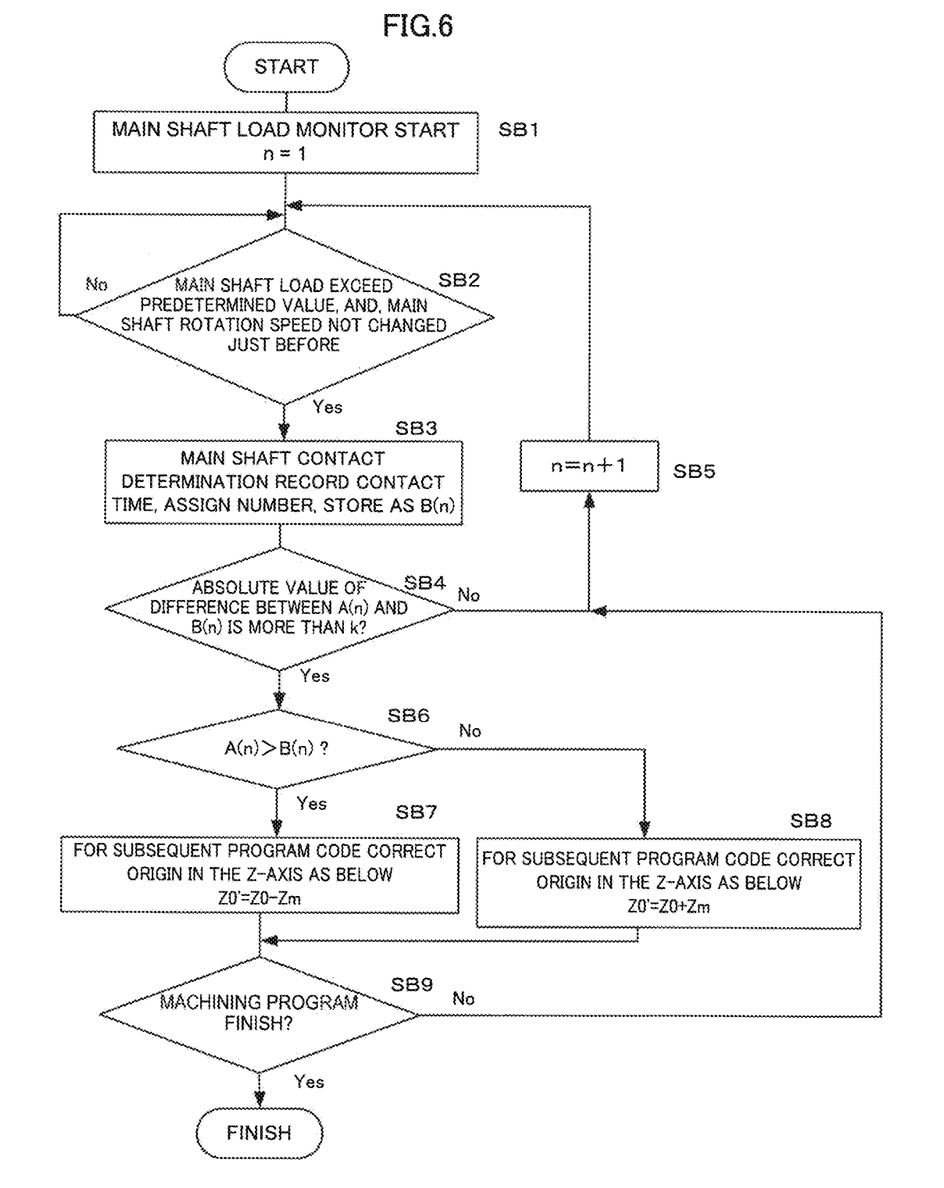
FIG. 6 is a flow chart showing a flow of correcting thermal displacement.

Flows of thermal displacement correction in the present embodiment are shown in flow charts of FIGS. 5 and 6.

As the first step, the series of machining programs is operated to set a reference time from a start of machining operation to tool contact in each machining operation. When the step is performed, it is desirable that circumstances, such as a machine temperature and an external temperature, in which the machine tool is installed, are in an ideal state, such as a state in which the machine is cooled enough or the external temperature is maintained at about 25° C., for example.

The main shaft load is monitored from a start of operation of the machining programs to store a time from the start of operation of the machining programs to a time when the tool contacts with a work in a recording medium in a numeric value control device. An n-th main shaft tool contact time in the machining programs in the first step is indicated as A(n). With regard to the monitoring of the main shaft load, as shown in FIG. 3, when a load equal to or more than a predetermined value is applied to the main shaft without a command of changing a rotation speed of the main shaft within Δt msec. from the time of applying the load, it is determined that there is contact. The Δt msec. is longer than a time required for changing the rotation speed of the main shaft.

A flow of acquisition of the reference times above will be described for each of steps in the flow chart shown in FIG. 5, the steps including:

step SA1: Start machining programs to start monitoring the main shaft load and timing, and set a value of "n" at 1;

step SA2: Determine whether the main shaft load exceeds a prescribed value and a rotation speed of the main shaft is not changed just before the determination. If both of them are satisfied (YES), proceed to step SA3. If any one of them is not satisfied (NO), repeat step SA2 waiting for both of them to be satisfied;

step SA3: Determine that the tool is brought into contact with the work to record a time value at every time of the contact as a reference contact time and assign numbers to the time values to store them as A(n);

step SA4: Determine whether the machining programs are finished. If the machining programs are finished (YES), exit the program, and if the programs are not finished, proceed to step SA5; and step SA5: Add a value of 1 to a value of "n" to return to step SA2;

Thus every contact time when the tool is brought into contact with the work during the machining programs can be stored in order of every contact as a reference contact time.

Next, a new work is attached for the second step to operate the machining programs exactly the same as those in the first step. Like the first step, the main shaft load is monitored from a start of operation of the machining programs, and first a time B(1) from the start of the operation of the machining programs to tool contact is measured. A time from an n-th start of operation of the machining programs to tool contact during performing the machining programs in the second step is indicated as B(n).

A measured time B(1) is compared with the time A(1) of the first machining operation stored in the first step. When A(1) and B(1) are compared, if B(1) is lower than A(1) with a difference equal to or more than an allowance (k msec.), the main shaft is displaced by a value equal to or more than the allowance due to change in an outside temperature, whereby it is determined that correction is needed.

Displacement Zm serving as the displacement above can be expressed as follows:

$$Zm = X \text{ msec.} \times Y \text{ mm/sec.}$$

Where

X: a time difference between B(n) and A(n) (in this case n=1)

Y: a feed speed in the Z-axis at the time of A(n) (in this case n=1)

Since the same machining programs are operated in the first and second steps, a feed speed in the Z-axis at the time of each contact is the same.

In subsequent machining operation, an origin Z0 in the Z-axis is updated as follows. An example of An<Bn will be shown below:

$$Z0' = Z0 + Zm$$

where

Z0': the origin in the Z-axis after update

Z0: the origin in the Z-axis before the update

After the update of the origin in the Z-axis, in a second machining operation as well as in a first machining operation, a time B(2) from a start of machining operation to tool contact is measured to be compared with A(2) so that it is determined whether correction is needed, whereby the correction is conducted if needed.

The processing above is repeated until the machining programs are finished.

A flow of correction of the thermal displacement above will be described for each of steps in the flow chart shown in FIG. 6, the steps including:

step SB1: Start machining programs to start monitoring the main shaft load and timing, and set a value of "n" at 1.

step SB2: Determine whether the main shaft load exceeds a prescribed value and a rotation speed of the main shaft is not changed just before the determination. If the main shaft load exceeds a predetermined value and the rotation speed of the main shaft is not changed just before the determination (YES), proceed to step SB3. Other than the case above (NO), repeat step SB2 waiting for both conditions to be satisfied;

step SB3: Determine that the tool is brought into contact with the work to record a time value at every time of the contact as a reference contact time and assign numbers to the time values to store them as B(n);

step SB4: Determine whether an absolute value of a difference between A(n) and B(n) is more than an allowance k. If the absolute value is more than the allowance k (YES), proceed to step SB6. If the absolute value is equal to or less than the allowance k, proceed to step SB5;

step SB5: to add a value of 1 to a value of "n" to return to step SB2;

step SB6: to be determined whether a value of A(n) is more than that of B(n) to proceed to step SB7, if A(n) is more than B(n) (YES), and proceed to step SB8, conversely if B(n) is more than A(n);

step SB7: to correct an origin in the Z-axis to Z0'=Z0−Zm for the subsequent program codes to proceed to step SB9;

step SB8: to correct the origin in the Z-axis to Z0'=Z0+Zm for the subsequent program codes to proceed to step SB9; and step SB9: Determine whether the machining programs are finished. If the machining programs are finished (YES), exit the program. If the programs are not finished, return to step SB5.

Instead of comparing contact time in the embodiment described above, a coordinate of the tool 30 when the tool 30 is brought into contact with a machining work or the work 32 is compared in an embodiment described below.

The "coordinate" in the present embodiment serves as a unique coordinate of the machine tool.

Figure 7:
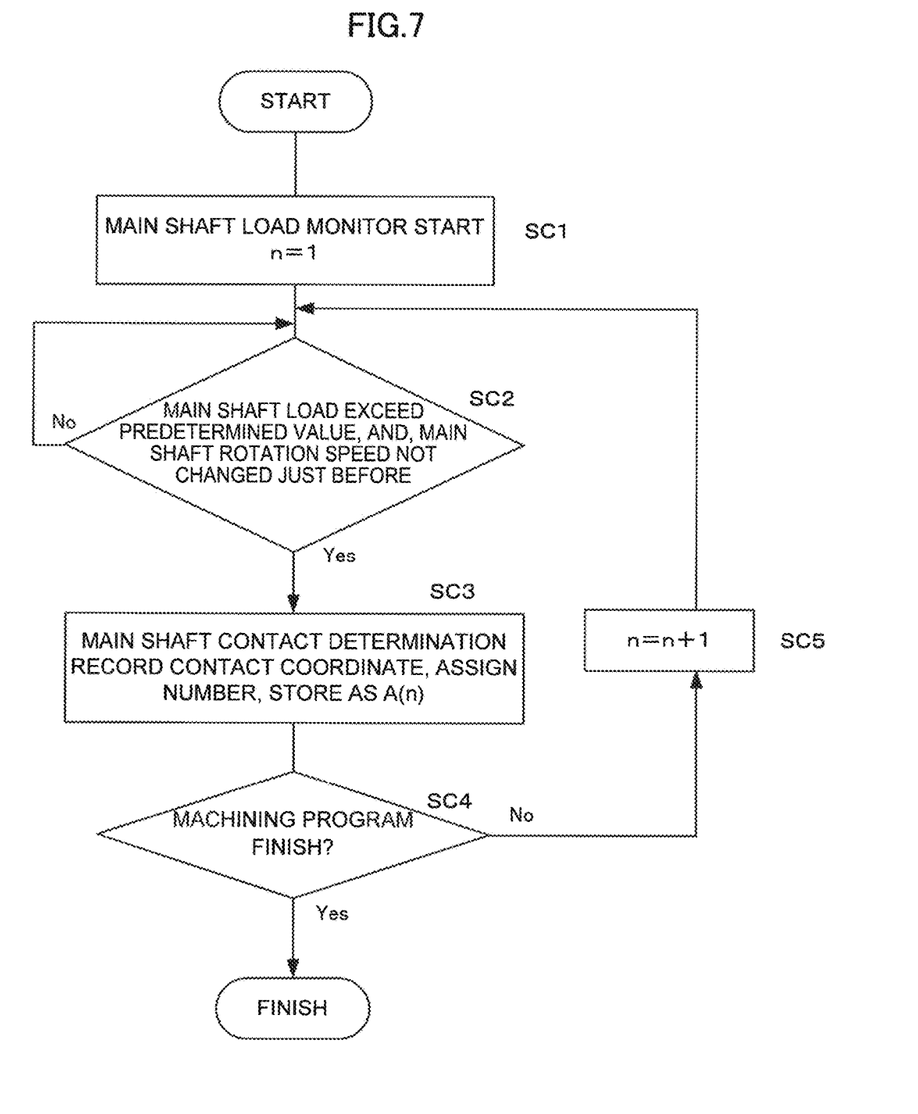
FIG. 7 is a flow chart showing a flow of setting a reference time.
Figure 8:
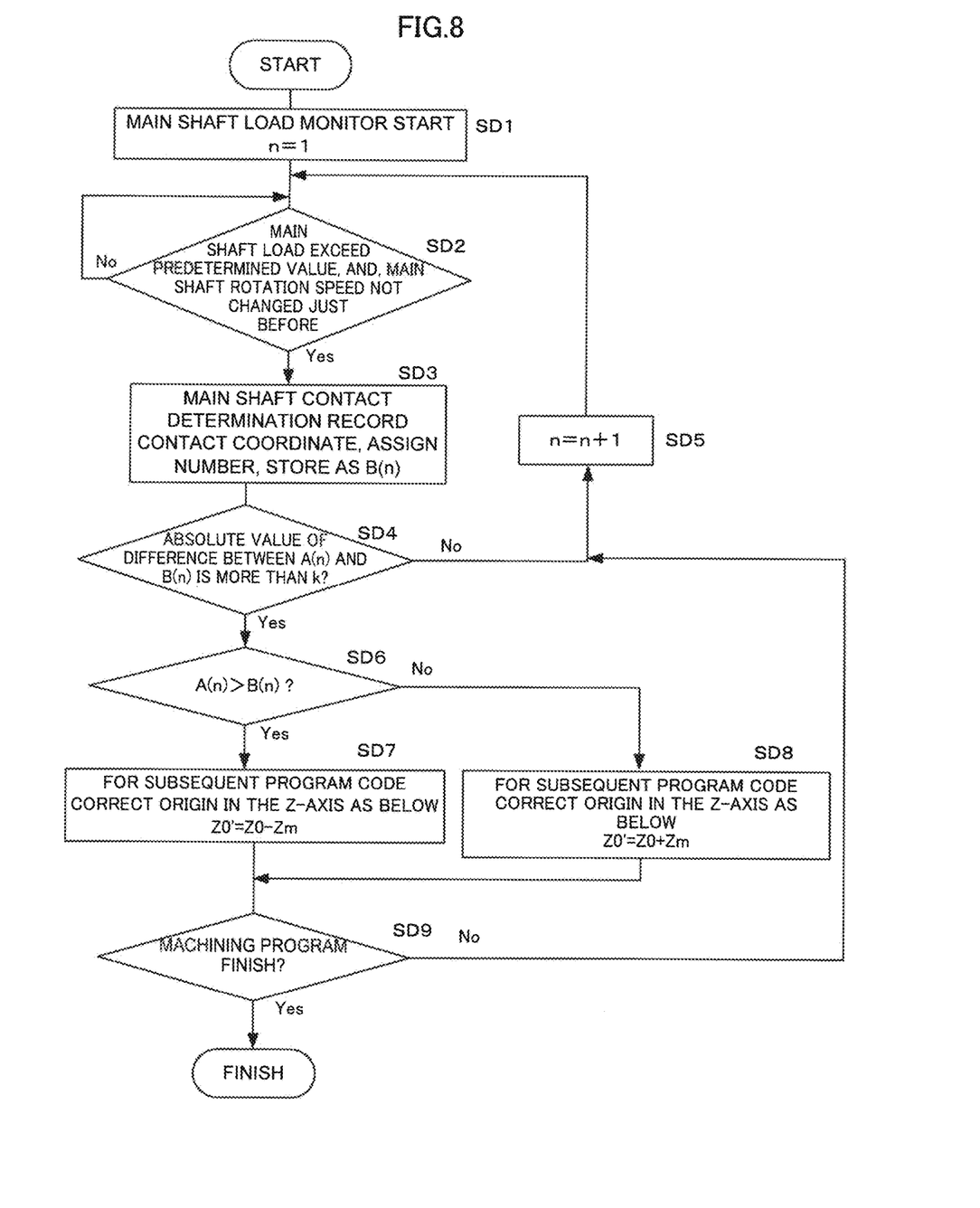
FIG. 8 is a flow chart showing a flow of correcting thermal displacement.

Flows of correction of thermal displacement are shown in flow charts of FIGS. 7 and 8.

As the first step, the series of machining programs is operated to set a reference coordinate to tool contact in each machining operation. When the step is performed, it is desirable that circumstances, such as a machine temperature and an external temperature, in which the machine tool is installed, are in an ideal state, such as a state in which the machine is cooled enough or the external temperature is maintained at about 25° C., for example.

The main shaft load is monitored from a start of operation of the machining program to store a coordinate when the tool is brought into contact with a work in a recording medium in a numeric value control device. An n-th main shaft tool contact coordinate in the machining programs in the first step is indicated as A(n). With regard to the monitoring the main shaft load, as shown in FIG. 3, when a load equal to or more than a predetermined value is applied to the main shaft and there is no command of changing a rotation speed of the main shaft within Δt msec. from the time of applying the load, it is determined that there is contact. The Δt msec. is longer than a time required for changing the rotation speed of the main shaft.

A flow of acquisition of the reference times above will be described for each of steps in the flow chart shown in FIG. 7, the steps including:

step SC1: Start machining programs to start monitoring the main shaft load, and set a value of "n" at 1;

step SC2: Determine whether the main shaft load exceeds a prescribed value as well as a rotation speed of the main shaft is changed just before the determination. If both of them are satisfied (YES), proceed to step SC3. If any one of them is not satisfied (NO), repeated step SC2 waiting for both of them to be satisfied;

step SC3: Determine that the tool is brought into contact with the work to record a time value at every time of the contact as a reference contact time and assign numbers to the time values to store them as A(n);

step SC4: Determine whether the machining programs are finished. If the machining programs are finished (YES), exit the program. If the programs are not finished, proceed to step SC5; and step SC5: Add a value of 1 to a value of "n" to return to step SC2.

As a result, it is possible to sore every contact coordinate when the tool is brought into contact with the work during performing the machining programs in order of every contact as a reference contact coordinate.

Next, a new work is attached for the second step to operate the machining programs exactly the same as those in the first step. Like the first step, the main shaft load is monitored from a start of machining operation in each machining operation and a coordinate B(1) at the time of tool contact is measured. A coordinate at the time of an n-th tool contact in the machining programs in the second step is indicated as B(n).

A measured time B(1) is compared with the coordinate A(1) of the first machining operation stored in the first step. When A(1) and B(1) are compared, if an absolute value of a difference between B(1) and A(1) is equal to or more than an allowance k mm, the main shaft is displaced by a value equal to or more than the allowance due to change in an outside temperature, whereby it is determined that correction is needed.

Displacement Zm serving as the displacement above can be expressed as follows:

$$Zm=B(n)-A(n)$$

In subsequent machining operation, an origin Z0 in the Z-axis is updated by using the displacement Zm as follows:

$$Z0'=Z0+Zm$$

where

Z0': the origin in the Z-axis after update

Z0: the origin in the Z-axis before the update

After the update of the origin in the Z-axis, in a second machining operation as well as in a first machining operation, a time B(2) from a start of machining operation to tool contact is measured to be compared with A(2) so that it is determined whether correction is needed, whereby the correction is conducted if needed.

The processing above is repeated until the machining programs are finished.

A flow of correction of the thermal displacement above will be described for each of steps in the flow chart shown in FIG. 8, the steps including:

step SD1: Start machining programs to start monitoring the main shaft load, and set a value of "n" at 1.

step SD2: Determine whether the main shaft load exceeds a prescribed value and a rotation speed of the main shaft is not changed just before the determination. If the main shaft load exceeds a predetermined value and the rotation speed of the main shaft is not changed just before the determination (YES), proceed to step SD3. Other than the case above (NO), repeat step SD02 waiting for both conditions to be satisfied;

step SD3: Determine that the tool is brought into contact with the work to record a coordinate value at every time of the contact as a reference contact coordinate and assign numbers to the coordinate values to store them as B(n);

step SD4: Determine whether an absolute value of a difference between A(n) and B(n) is more than an allowance k. If the absolute value is more than the allowance k (YES), proceed to step SD6. If the absolute value is equal to or less than the allowance k, proceed to step SD5;

step SD5: Add a value of 1 to a value of "n" to return to step SD2;

step SD6: Determine whether a value of A(n) is more than that of B(n). If A(n) is more than B(n) (YES), proceed to step SD7. If B(n) is more than A(n) conversely, proceed to step SD8;

step SD7: Correct an origin in the Z-axis to Z0'=Z0−Zm for the subsequent program codes to proceed to step SD9;

step SD8: Correct the origin in the Z-axis to Z0'=Z0+Zm for the subsequent program codes to proceed to step SD9; and step SD9: Determine whether the machining programs are finished. If the machining programs are finished (YES), exit the program. If the programs are not finished, return to step SD5.

What is claimed is:

1. A numerical control machine tool with a thermal displacement correction, comprising:
    a table;
    a main shaft;
    a main shaft straight line movement shaft configured to move the main shaft provided with a tool;
    two or more table straight line movement shafts configured to move the table;
    a numeric value control device for controlling the main shaft straight line movement shaft and the table straight line movement shafts,
    the numerical control machine tool further comprising:
    a main shaft motor;
    a shaft load measuring unit configured to measure a load of the main shaft motor for driving the main shaft straight line movement shaft;
    a reference contact time storage unit configured to store a time, from when the main shaft starts to move and time measurement begins at a predetermined position where the tool is not in contact with a work arranged on the table, to when the load of the main shaft motor measured by the shaft load measuring unit exceeds a predetermined value to be determined that the tool contacts the work, as a reference contact time;
    an actual contact time storage unit configured to store a time, from when the main shaft starts to move and time measurement begins at a predetermined position where the tool is not in contact with the work arranged on the table, to when the load of the main shaft motor measured by the shaft load measuring unit exceeds the predetermined value to be determined that the tool contacts the work in machining after the reference contact time, as an actual contact time;
    a thermal displacement calculation unit configured to calculate thermal displacement by multiplying a feed speed of the main shaft by a time difference between the reference contact time and the actual contact time when the time difference exceeds a predetermined time; and
    a thermal displacement correction unit configured to correct a movement amount of the main shaft straight line movement shaft, based on the thermal displacement calculated by the thermal displacement calculation unit.

2. The numerical control machine tool according to claim 1, wherein the reference contact time starts when the external temperature is maintained at about 25 degrees.

3. The numerical control machine tool according to claim 1, wherein the thermal displacement calculated by the thermal displacement calculation unit is a thermal displacement of the main shaft caused by heat generated at least by the main shaft motor.

4. A machine tool with a thermal displacement correction, the machine tool serving as a numerical control machine tool comprising:
    a table;
    a main shaft;
    a main shaft straight line movement shaft for moving the main shaft provided with a tool;
    two or more table straight line movement shafts for moving the table;
    a numeric value control device for controlling the main shaft straight line movement shaft and the table straight line movement shafts,
    the numerical control machine tool further comprising:
    a main shaft motor;
    a shaft load measuring unit configured to measure a load of the main shaft motor for driving the main shaft straight line movement shaft;
    a reference contact coordinate storage unit configured to store a coordinate where the load of the main shaft motor measured by the shaft load measuring unit exceeds a predetermined value to be determined that the tool contacts the work, as a reference contact coordinate;
    an actual contact coordinate storage unit configured to store a coordinate where the tool contacts the work with the load of the main shaft motor measured by the shaft load measuring unit exceeds the predetermined value in machining after the reference contact coordinate, as an actual contact coordinate;
    a thermal displacement calculation unit configured to calculate a value of a difference between the reference contact coordinate and the actual contact coordinate as a thermal displacement when the difference exceeds a predetermined value; and
    a thermal displacement correction unit configured to correct a movement amount of the main shaft straight line movement shaft, based on the thermal displacement calculated by the thermal displacement calculation unit.

5. The machine tool according to claim 4, wherein the load of the main shaft motor is measured for the reference contact the external temperature is maintained at about 25 degrees.

6. The machine tool according to claim 4, wherein the thermal displacement calculated by the thermal displacement calculation unit is a thermal displacement of the main shaft caused by heat generated at least by the main shaft motor.

* * * * *